United States Patent
Mendez Agudelo et al.

(10) Patent No.: US 11,101,500 B2
(45) Date of Patent: Aug. 24, 2021

(54) ELECTROCHEMICAL CELLS COMPRISING BIFUNCTIONAL PHOSPHONIC ACID SILYLESTERS

(71) Applicant: BASF SE, Ludwigshafen am Rhein (DE)

(72) Inventors: Manuel Alejandro Mendez Agudelo, Ludwigshafen (DE); Johannes David Hoecker, Ludwigshafen (DE); Frederick Francois Chesneau, Ludwigshafen (DE); Kazuki Yoshida, Amagasaki (JP); Jinbum Kim, Amagasaki (JP)

(73) Assignee: BASF SE, Ludwigshafen (DE)

( * ) Notice: Subject to any disclaimer, the term of this patent is extended or adjusted under 35 U.S.C. 154(b) by 111 days.

(21) Appl. No.: 16/333,431

(22) PCT Filed: Sep. 20, 2017

(86) PCT No.: PCT/EP2017/073698
§ 371 (c)(1),
(2) Date: Mar. 14, 2019

(87) PCT Pub. No.: WO2018/054933
PCT Pub. Date: Mar. 29, 2018

(65) Prior Publication Data
US 2019/0252722 A1 Aug. 15, 2019

(30) Foreign Application Priority Data
Sep. 21, 2016 (EP) .................... 16189961

(51) Int. Cl.
| | | |
|---|---|---|
| *H01M 10/0567* | (2010.01) | |
| *H01M 10/0525* | (2010.01) | |
| *H01M 4/505* | (2010.01) | |
| *H01M 4/525* | (2010.01) | |
| *H01M 4/58* | (2010.01) | |
| *H01M 4/136* | (2010.01) | |
| *H01M 4/131* | (2010.01) | |
| *H01M 4/02* | (2006.01) | |

(52) U.S. Cl.
CPC ....... *H01M 10/0567* (2013.01); *H01M 4/505* (2013.01); *H01M 4/525* (2013.01); *H01M 4/5825* (2013.01); *H01M 10/0525* (2013.01); *H01M 4/131* (2013.01); *H01M 4/136* (2013.01); *H01M 2004/028* (2013.01); *H01M 2300/0025* (2013.01)

(58) Field of Classification Search
CPC .. H01M 10/0567; H01M 4/505; H01M 4/525; H01M 4/5825; H01M 10/0525; H01M 4/136; H01M 4/131; H01M 2004/028; H01M 2300/0025; H01M 10/052; Y02E 60/10
See application file for complete search history.

(56) References Cited

U.S. PATENT DOCUMENTS

| | | | |
|---|---|---|---|
| 6,379,846 B1 | 4/2002 | Terahara et al. | |
| 8,734,668 B2 | 5/2014 | Bhat et al. | |
| 8,993,158 B2 | 3/2015 | Kobayashi et al. | |
| 2006/0088763 A1* | 4/2006 | Li ..................... | H01M 10/0567 429/188 |
| 2010/0086853 A1* | 4/2010 | Venkatachalam ........................... | C01G 45/1228 429/223 |
| 2013/0029217 A1 | 1/2013 | Bhat et al. | |
| 2013/0071732 A1 | 3/2013 | Kobayashi et al. | |
| 2013/0164604 A1* | 6/2013 | Matsumoto ....... | H01M 10/0569 429/163 |
| 2014/0152269 A1 | 6/2014 | Bhat et al. | |
| 2017/0040649 A1 | 2/2017 | Schmitz et al. | |
| 2017/0214097 A1 | 7/2017 | Schmitz et al. | |

FOREIGN PATENT DOCUMENTS

| | | |
|---|---|---|
| EP | 1 037 293 A1 | 9/2000 |
| WO | WO 2013/026854 A1 | 2/2013 |
| WO | WO 2015/158755 A1 | 10/2015 |

(Continued)

OTHER PUBLICATIONS

Extended European Search Report dated Dec. 13, 2016 in Patent Application No. 16189961.2, 3 pages.

(Continued)

*Primary Examiner* — Muhammad S Siddiquee
(74) *Attorney, Agent, or Firm* — Lowenstein Sandler LLP

(57) ABSTRACT

An electrochemical cell comprising (A) an anode comprising at least one anode active material, (B) a cathode comprising at least one cathode active material selected from mixed lithium transition metal oxides containing Mn and at least one second transition metal; lithium intercalating mixed oxides containing Ni, Al and at least one second transition metal; $LiNiPO_4$; $LiMnPO_4$; and $LiCoPO_4$; (C) an electrolyte composition containing (i) at least one aprotic organic solvent; (ii) at least one lithium ion containing conducting salt; (iii) a compound of formula (I).

(I)

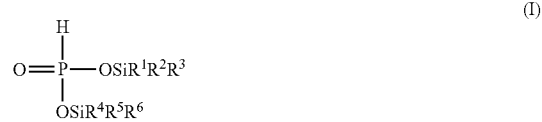

20 Claims, No Drawings

(56) References Cited

FOREIGN PATENT DOCUMENTS

WO  WO 2016/009052 A1  1/2016

OTHER PUBLICATIONS

International Preliminary Report on Patentability and Written Opinion of the International Searching Authority dated Mar. 26, 2019 in PCT/EP2017/073698 filed Sep. 20, 2016, 7 pages.
Ran Elazari, et al., "Rechargeable Lithiated Silicon-Sulfur (SLS) Battery Prototypes" Electrochemistry Communications, vol. 14, Issue 1, Jan. 2012, pp. 21-24.
Robert Rabinowitz, "The Reactions of Phosphonic Acid Esters with Acid Chlorides. A Very Mild Hydrolytic Route" Journal of Organic Chemistry, vol. 28, Issue 11, 1963, pp. 2975-2978.
Mitsuo Sekine, et al., "Silyl Phosphites. 15.[1] Reactions of Silyl Phosphites with α-Halo Carbonyl Compounds. Elucidation of the Mechanism of the Perkow Reaction and Related Reactions with Confirmed Experiments", Journal of Organic Chemistry, vol. 46, Issue 10, 1981, pp. 2097-2107.
U.S. Appl. No. 16/333,619, filed Mar. 15, 2019, Johannes David Hoecker, et al.
International Search Report dated Nov. 3, 2017 in PCT/EP2017/073698 filed on Sep. 20, 2017.

\* cited by examiner

ELECTROCHEMICAL CELLS COMPRISING BIFUNCTIONAL PHOSPHONIC ACID SILYLESTERS

DESCRIPTION

The present invention relates to an electrochemical cell comprising a cathode active material selected from mixed lithium transition metal oxides containing Mn and at least one second transition metal; lithium intercalating mixed oxides containing Ni, Al and at least one second transition metal; $LiNiPO_4$; $LiMnPO_4$; and $LiCoPO_4$ and an electrolyte composition containing a compound of formula (I)

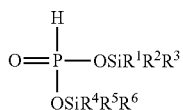
(I)

with $R^1$ to $R^6$ as defined below.

The present invention also relates to the use of compounds of formula (I) as cathode active additives and as additives for reducing the gas generation in electrolyte compositions for electrochemical cells.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode.

U.S. Pat. No. 8,734,668 B2 describes electrolyte compositions comprising silicon containing compounds which may additionally contain hetero atoms like B, Al, P, S, F, Cl, Br, and I.

U.S. Pat. No. 8,993,158 B2 discloses electrolyte compositions for use in lithium ion batteries comprising silyl ester group-containing phosphonic acid derivatives to inhibit increase of the battery resistance and deterioration of the battery performance in a high-temperature environment.

US 2013/0164604 A1 refers to the use of phosphite esters, phosphonate esters and bisphosphonate esters as additives in electrolyte compositions for lithium ion batteries.

Novel cathode active materials are used for increasing the performance of lithium batteries. These cathode active materials have higher specific energies and/or higher working voltages. Examples of such cathode active materials are high energy NCM (lithiated mixed oxides of Ni, Co and Mn, so-called HE-NCM), high voltage manganese spinels with layer structure containing additional transition metals and lithium nickel cobalt aluminium oxides (also named NCA). For some of these cathode active materials high cut-off voltages have to be used during charging to obtain the desired high specific energies. These cathode active materials place new demands on the electrolyte compositions used, e.g. in regard to stability towards high voltage, $O_2$ release, solvation of transition metal cations leading to metal dissolution, gas evolution upon storage, etc.

There is the need for electrolyte compositions optimized for the use with such cathode materials yielding lithium batteries showing high capacity retention, good long-term performance, high safety, reduced gas evolution, and decreased impedance build-up.

It is an objective of the present invention to provide electrochemical cells comprising cathode active materials having high specific energies and/or high working voltages and electrolyte compositions well adapted for the use together with these cathode active materials resulting in electrochemical cells with high capacity retention, good long-term performance and high safety. It is also an object of the present invention to provide a cathode active additive for use in the electrolyte composition of electrochemical cells and an additive for electrolytes of electrochemical cells for lowering the gas generation in the electrochemical cells comprising the afore-mentioned cathode active materials.

Accordingly, an electrochemical cell is provided, comprising
  (A) an anode comprising at least one anode active material,
  (B) a cathode comprising at least one cathode active material selected from mixed lithium transition metal oxides containing Mn and at least one second transition metal; lithium intercalating mixed oxides containing Ni, Al and at least one second transition metal; $LiNiPO_4$; $LiMnPO_4$; and $LiCoPO_4$;
  (C) an electrolyte composition containing
    (i) at least one aprotic organic solvent;
    (ii) at least one lithium ion containing conducting salt;
    (iii) a compound of formula (I)

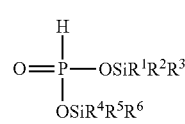
(I)

wherein
  $R^1$, $R^2$, $R^3$, $R^4$, $R^5$, and $R^6$ are independently from each other selected from H, F, $R^7$, $OR^7$, and $OSi(R^8)_3$;
  $R^7$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F; and
  $R^8$ is independently at each occurrence selected from H, F, $R^7$ and $OR^7$;

or wherein $R^1$ and $R^4$ are combined and jointly selected from O, $CR^9R^{10}$, and $NR^{11}$ 1and form a 6-membered cycle with the Si—O—P—O—Si group;

$R^9$ and $R^{10}$ are selected independently from each other from H, F, $R^7$, $OR^7$, and $OSiR^8{}_3$;

$R^{11}$ is selected from H and $R^7$; and $R^2$, $R^3$, $R^5$, $R^6$, $R^7$, and $R^8$ are independently from each other selected as defined above; and (iv) optionally one or more additives.

Additionally the use of compounds of formula (I) as cathode active additive in electrolyte compositions for electrochemical cells and as additive in electrolyte compositions for electrochemical cells for lowering the gas generation in the electrochemical cells is provided. The electrochemical cells according to the invention exhibit good capacity retention, good long term performance, decreased cell resistance and reduced gas generation.

In the following the invention is described in detail.

The inventive electrochemical cell comprises an electrolyte composition (C). Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The electrolyte composition contains at least one aprotic organic solvent (i). The at least one aprotic organic solvent may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles and optionally fluorinated cyclic and acyclic phosphates and mixtures thereof.

Examples of optionally fluorinated cyclic carbonates are ethylene carbonate (EC), propylene carbonate (PC) and butylene carbonate (BC), wherein one or more H may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred optionally fluorinated cyclic carbonates are ethylene carbonate, monofluoroethylene carbonate, and propylene carbonate, in particular ethylene carbonate.

Examples of optionally fluorinated acyclic carbonates are di-$C_1$-$C_{10}$-alkylcarbonates, wherein each alkyl group is selected independently from each other and wherein one or more H may be substituted by F. Preferred are optionally fluorinated di-$C_1$-$C_4$-alkylcarbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of optionally fluorinated acyclic ethers and polyethers are optionally fluorinated di-$C_1$-$C_{10}$-alkylethers, optionally fluorinated di-$C_1$-$C_4$-alkyl-$C_2$-$C_6$-alkylene ethers, optionally fluorinated polyethers, and fluorinated ethers of formula R'-(O—$CF_pH_{2-p}$)$_q$—R" wherein R' is a $C_1$-$C_{10}$ alkyl group or a $C_3$-$C_{10}$ cycloalkyl group, wherein one or more H of an alkyl and/or cycloalkyl group are substituted by F; R" is H, F, a $C_1$-$C_{10}$ alkyl group, or a $C_3$-$C_{10}$ cycloalkyl group, wherein one or more H of an alkyl and/or cycloalkyl group are substituted by F; p is 1 or 2; and q is 1, 2 or 3.

According to the invention each alkyl group of the optionally fluorinated di-$C_1$-$C_{10}$-alkylethers is selected independently from the other wherein one or more H of an alkyl group may be substituted by F. Examples of optionally fluorinated di-$C_1$-$C_{10}$-alkylethers are dimethylether, ethylmethylether, diethylether, methylpropylether, diisopropylether, di-n-butylether, 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable optionally fluorinated polyethers are polyalkylene glycols wherein one or more H of an alkyl or alkylene group may be substituted by F, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of fluorinated ethers of formula R'-(O—$CF_pH_{2-p}$)$_q$—R" are 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated cyclic ethers are 1,4-dioxane, tetrahydrofuran, and their derivatives like 2-methyl tetrahydrofuran wherein one or more H of an alkyl group may be substituted by F.

Examples of optionally fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of optionally fluorinated acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of optionally fluorinated acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of optionally fluorinated cyclic and acyclic sulfones are ethyl methyl sulfone, dimethyl sulfone, and tetrahydrothiophene-S,S-dioxide (sulfolane).

Examples of optionally fluorinated cyclic and acyclic nitriles and dinitriles are adipodinitrile, acetonitrile, propionitrile, and butyronitrile wherein one or more H may be substituted by F.

Examples of optionally fluorinated cyclic and acyclic phosphates are trialkyl phosphates wherein one or more H of an alkyl group may be substituted by F like trimethyl phosphate, triethyl phosphate, and tris(2,2,2-trifluoroethyl) phosphate.

More preferred the aprotic organic solvent(s) are selected from optionally fluorinated ethers and polyethers, optionally fluorinated cyclic and acyclic organic carbonates, optionally fluorinated cyclic and acyclic esters and diesters of carboxylic acids and mixtures thereof. Even more preferred the aprotic organic solvent(s) are selected from optionally fluorinated ethers and polyethers, and optionally fluorinated cyclic and acyclic organic carbonates, and mixtures thereof.

According to one embodiment the electrolyte composition contains at least solvent selected from fluorinated ethers and polyethers, e.g. compounds of formula fluorinated ethers of formula R'—(O—CF$_p$H$_{2+p}$)$_q$—R" as defined above like CF$_2$HCF$_2$CH$_2$OCF$_2$CF$_2$H or CF$_2$H(CF$_2$)$_3$CH$_2$OCF$_2$CF$_2$H.

According to another embodiment, the electrolyte composition contains at least one solvent selected from fluorinated cyclic carbonate like 1-fluoro ethyl carbonate.

According to a further embodiment the electrolyte composition contains at least one solvent selected from fluorinated cyclic carbonate, e.g. 1-fluoro ethyl carbonate, and at least one solvent selected from fluorinated ethers and polyethers, e.g. compounds of formula fluorinated ethers of formula R'—(O—CF$_r$H$_{2-r}$)$_s$—R" as defined above like CF$_2$HCF$_2$CH$_2$OCF$_2$CF$_2$H or CF$_2$H(CF$_2$)$_3$CH$_2$OCF$_2$CF$_2$H.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

The electrolyte composition contains at least one lithium ion containing conducting salt (ii). The electrolyte composition functions as a medium that transfers ions participating in the electrochemical reaction taking place in an electrochemical cell. The lithium ion containing conducting salt(s) (ii) present in the electrolyte composition are usually solvated in the aprotic organic solvent(s) (i). Examples of lithium ion containing conducting salts are Li[F$_{6-x}$P(C$_y$F$_{2y+1}$)$_x$], wherein x is an integer in the range from 0 to 6 and y is an integer in the range from 1 to 20;

Li[B(R$^I$)$_4$], Li[B(R$_I$)$_2$(OR$^{II}$O)] and Li[B(OR$^{II}$O)$_2$] wherein each R$^I$ is independently from each other selected from F, Cl, Br, I, C$_1$-C$_4$ alkyl, C$_2$-C$_4$ alkenyl, C$_2$-C$_4$ alkynyl, OC$_1$-C$_4$ alkyl, OC$_2$-C$_4$ alkenyl, and OC$_2$-C$_4$ alkynyl wherein alkyl, alkenyl, and alkynyl may be substituted by one or more OR$^{III}$, wherein R$^{III}$ is selected from C$_1$-C$_6$ alkyl, C$_2$-C$_6$ alkenyl, and C$_2$-C$_6$ alkynyl, and (OR$^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[Z(C$_n$F$_{2n+1}$SO$_2$)$_m$], where m and n are defined as follows:

m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (OR$^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated C$_1$-C$_4$ alkyl group. An example for such 1,2- or 1,3-diole is 1,1,2,2-tetra(trifluoromethyl)-1,2-ethane diol.

"Fully fluorinated C$_1$-C$_4$ alkyl group" means, that all H-atoms of the alkyl group are substituted by F.

Suited 1,2- or 1,3-dicarboxlic acids from which the bivalent group (OR$^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated C$_1$-C$_4$ alkyl group.

Suited 1,2- or 1,3-hydroxycarboxylic acids from which the bivalent group (OR$^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated C$^1$-C$_4$ alkyl group. An example for such 1,2- or 1,3-hydroxycarboxylic acids is 2,2-bis(trifluoromethyl)-2-hydroxy-acetic acid.

Examples of Li[B(R$^I$)$_4$], Li[B(R$^{II}$)$_2$(OR$^{II}$O)] and Li[B (OR$^{II}$O)$^2$] are LiBF$_4$, lithium difluoro oxalato borate and lithium dioxalato borate.

Preferably the at least one lithium ion containing conducting salt is selected from LiPF$_6$, LiAsF$_6$, LiSbF$_6$, LiCF$_3$SO$_3$, LiBF$_4$, lithium bis(oxalato) borate, LiClO$_4$, LiN(SO$_2$C$_2$F$_5$)$_2$, LiN(SO$_2$CF$_3$)$_2$, LiN(SO$_2$F)$_2$, and LiPF$_3$(CF$_2$CF$_3$)$_3$, more preferred the conducting salt is selected from LiPF$_6$, LiN(SO$_2$F)$_2$, and LiBF$_4$, and the most preferred conducting salt is LiPF$_6$.

The lithium conducting salt(s) are usually present at a minimum concentration of at least 0.1 mol/l, preferably the concentration of the ion containing conducting salt(s) is 0.5 to 2 mol/l based on the entire electrolyte composition.

The electrolyte composition (C) contains at least one compound of formula (I):

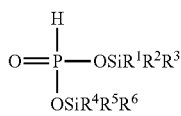
(I)

wherein
$R^1$, $R^2$, $R^3$, $R^4$, $R^5$, and $R^6$ are independently from each other selected from H, F, $R^7$, $OR^7$, and $OSi(R^8)_3$;
$R^7$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F; and
$R^8$ is independently at each occurrence selected from H, F, $R^7$ and $OR^7$;
or wherein $R^1$ and $R^4$ are combined and jointly selected from O, $CR^9R^{10}$, and $NR^{11}$ and form a 6-membered cycle with the Si—O—P—O—Si group;
$R^9$ and $R^{10}$ are selected independently from each other from H, F, $R^7$, $OR^7$, and $OSiR^8_3$;
$R^{11}$ is selected from H and $R^7$; and
$R^2$, $R^3$, $R^5$, $R^6$, $R^7$, and $R^8$ are independently from each other selected as defined above.

Compound(s) of formula (I) are also referred to as component (iii) of the electrolyte composition.

The term "$C_1$-$C_6$ alkyl" as used herein means a straight or branched saturated hydrocarbon group with 1 to 6 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, and the like. Preferred are $C_1$-$C_4$ alkyl, more preferred are methyl, ethyl, and n- and iso-propyl and most preferred is methyl.

The term "$C_2$-$C_6$ alkenyl" as used herein refers to an unsaturated straight or branched hydrocarbon group with 2 to 6 carbon atoms having one free valence. Unsaturated means that the alkenyl group contains at least one C═C double bond. $C_2$-$C_6$ alkenyl includes for example ethenyl, 1-propenyl, 2-propenyl, 1-n-butenyl, 2-n-butenyl, iso-butenyl, 1-pentenyl, 1-hexenyl, and the like. Preferred are $C_2$-$C_4$ alkenyl groups, more preferred are ethenyl and propenyl, most preferred is 1-propen-3-yl, also called allyl.

The term "$C_2$ to $C_6$ alkynyl" as used herein refers to an unsaturated straight or branched hydrocarbon group with 2 to 6 carbon atoms having one free valence, wherein the hydrocarbon group contains at least one C═C triple bond. $C_2$-$C_6$ alkynyl includes for example ethynyl, propynyl, 1-n-butinyl, 2-n-butinyl, iso-butinyl, 1-pentynyl, 1-hexynyl, and the like. Preferred are $C_2$-$C_4$ alkynyl, more preferred are ethynyl and 1-propyn-3-yl (propargyl).

The term "$C_5$ to $C_7$ (hetero)aryl" as used herein denotes an aromatic 5- to 7-membered hydrocarbon cycle or condensed cycles having one free valence wherein one or more of the C-atoms of the aromatic cycle(s) may be replaced independently from each other by a heteroatom selected from N, S, O and P. Examples of $C_5$-$C_7$ (hetero)aryl are pyrrolyl, furanyl, thiophenyl, pyridinyl, pyranyl, thiopyranyl, and phenyl. Preferred is phenyl.

The term "$C_6$-$C_{13}$ (hetero)aralkyl" as used herein denotes an aromatic 5- to 7-membered hydro-carbon cycle substituted by one or more $C_1$-$C_6$ alkyl wherein one or more of the C-atoms of the aromatic cycle may be replaced independently from each other by a heteroatom selected from N, S, O and P. The $C_6$-$C_{13}$ (hetero)aralkyl group contains in total 6 to 13 C- and heteroatoms and has one free valence. The free valence may be located in the aromatic cycle or in a $C_1$-$C_6$ alkyl group, i.e. $C_6$-$C_{13}$ (hetero)aralkyl group may be bound via the (hetero)aromatic part or via the alkyl part of the group. Examples of $C_6$-$C_{13}$ (hetero)aralkyl are methylphenyl, 2-methylpyridyl, 1,2-dimethylphenyl, 1,3-dimethylphenyl, 1,4-dimethylphenyl, ethylphenyl, 2-propylphenyl, benzyl, 2-$CH_2$-pyridyl, and the like.

$R^1$, $R^2$, $R^3$, $R^4$, $R^5$, and $R^6$ are independently from each other selected from H, F, $R^7$, $OR^7$, and $OSi(R^8)_3$ wherein it is possible that $R^1$ and $R^4$ are combined and jointly selected from O, $CR^9R^{10}$, and $NR^{11}$ and form a 6-membered cycle with the Si—O—P—O—Si group of the compound of formula (I), preferably $R^1$, $R^2$, $R^3$, $R^4$, $R^5$, and $R^6$ are independently from each other selected from H, F, $R^7$, $OR^7$, and $OSi(R^8)_3$.

$R^1$, $R^2$, $R^3$, $R^4$, $R^5$, and $R^6$ are selected independently from each other, and may be same or different, or may partially be same and partially different.

Preferably $R^1$, $R^2$, $R^3$, $R^4$, $R^5$, and $R^6$ are independently from each other selected from $R^7$, $OR^7$, and $OSi(R^8)_3$, more preferred $R^1$, $R^2$, $R^3$, $R^4$, $R^5$, and $R^6$ are independently from each other selected from $R^7$ and $OR^7$, even more preferred $R^1$, $R^2$, $R^3$, $R^4$, $R^5$, and $R^6$ are independently from each other selected from $R^7$, most preferred $R^1$, $R^2$, $R^3$, $R^4$, $R^5$, and $R^6$ are independently from each other selected from $C_1$-$C_6$ alkyl, which may be substituted by one or more substituents selected from $OSi(CH_3)_3$ and F, in particular preferred $R^1$, $R^2$, $R^3$, $R^4$, $R^5$, and $R^6$ are independently from each other selected from $C_1$-$C_4$ alkyl.

$R^7$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F, preferably $R^7$ is selected from $C_1$-$C_6$ alkyl, $C_2$-$C_6$ alkenyl, and $C_2$-$C_6$ alkynyl, which may be substituted by one or more substituents selected from $OSi(CH_3)_3$ and F, more preferred $R^7$ is selected from $C_1$-$C_6$ alkyl and $C_2$-$C_6$ alkenyl, which may be substituted by one or more substituents selected from $OSi(CH_3)_3$ and F, even more preferred $R^7$ is selected from $C_1$-$C_6$ alkyl, which may be substituted by one or more substituents selected from $OSi(CH_3)_3$ and F, and most preferred $R^7$ is selected from C1-$C_4$ alkyl.

$R^8$ is independently at each occurrence selected from H, F, $R^7$ and $OR^7$, preferably $R^8$ is independently at each occurrence selected from $R^7$ and $OR^7$, even more preferred $R^8$ is independently at each occurrence selected from $R^7$ and most preferred $R^8$ is independently at each occurrence selected from $C_1$-$C_4$ alkyl.

According to one embodiment $R^1$, $R_2$, $R_3$, $R_4$, $R^5$, and $R^6$ are independently from each other selected from H, F, $R^7$, $OR^7$, and $OSi(R^8)_3$; wherein $R^8$ is independently at each occurrence selected from H, F, $R^7$ and $OR^7$; and $R^7$ is selected from $C_1$-$C_6$ alkyl, which may be substituted by one or more substituents selected from $OSi(CH_3)_3$ and F, preferably $R^1$, $R^2$, $R^3$, $R^4$, $R^5$, and $R^6$ are independently from each other selected from $R^7$, $OR^7$, and $OSi(R^8)_3$; wherein $R^8$ is independently at each occurrence selected from $R^7$ and $OR^7$; and $R^7$ is selected from $C_1$-$C_6$ alkyl, which may be substituted by one or more substituents selected from $OSi(CH_3)_3$ and F.

In case $R^1$ and $R^4$ are combined and jointly selected from O, $CR^9R^{10}$, and $NR^{11}$ and form a 6-membered cycle with the Si—O—P—O—Si group the compound of formula (I) is a compound of formula (Ia)

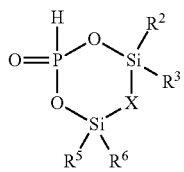

(Ia)

wherein X is selected from O, $CR^9R^{10}$, and $NR^{11}$;

$R^9$ and $R^{10}$ are selected independently from each other from H, F, $R^7$, $OR^7$, and $OSiR^8{}_3$;

$R^{11}$ is selected from H and $R^7$; and $R^2$, $R^3$, $R^5$, $R^6$, $R^8$ and $R^9$ are selected as defined above and as defined as preferred.

Preferably X is selected from O and $CR^9R^{10}$, and more preferred X is O.

$R^9$ and $R^{10}$ are selected independently from each other from H, F, $R^7$, $OR^7$, and $OSiR^8{}_3$, preferably $R^9$ and $R^{10}$ are selected independently from each other from H, $R^7$, and $OR^7$, more preferred $R^9$ and $R^{10}$ are selected independently from each other from H and $R^7$, even more preferred $R^9$ and $R^{10}$ are selected independently from each other from H and $C_1$-$C_6$ alkyl, most preferred $R^9$ and $R^{10}$ are H.

$R^{11}$ is selected from H and $R^7$, preferably $R^{11}$ is preferably selected from H, $C_1$-$C_6$ alkyl, and $C_5$-$C_7$ (hetero)aryl, more preferred $R^{11}$ is $C_1$-$C_4$ alkyl.

In case all $R_1$, $R_2$, $R_3$, $R_4$, $R^5$, and $R^6$ are independently from each other selected from H, F, $R^7$, $OR^7$, and $OSi(R^8)_3$, it is preferred that $R_1$, $R_2$, $R_3$, $R_4$, $R^5$, and $R^6$ are independently from each other selected from H, F, $R^7$, $OR^7$, and $OSi(R^8)_3$ wherein $R^7$ is selected from $C_1$-$C_6$ alkyl, $C_2$-$C_6$ alkenyl, and $C_5$-$C_7$ (hetero)aryl, which may be substituted by one or more substituents selected from $OSi(CH_3)_3$ and F, and $R^8$ is selected from $R^7$ and $OR^7$. More preferred $R_1$, $R_2$, $R_3$, $R_4$, $R_5$, and $R^6$ are independently from each other selected from H, F, $R^7$, $OR^7$, and $OSi(R^8)_3$ wherein $R^7$ is $C_1$-$C_6$ alkyl, which may be substituted by one or more substituents selected from $OSi(CH_3)_3$ and F, and $R^8$ is selected from $R^7$ and $OR^7$. Even more preferred $R_1$, $R_2$, $R_3$, $R_4$, $R^5$, and $R^6$ are independently from each other selected from $R^7$, $OR^7$, and $OSi(R^8)_3$ wherein $R^7$ is $C_1$-$C_6$ alkyl and $R^8$ is selected from $R^7$ and $OR^7$. Most preferred $R_1$, $R_2$, $R_3$, $R_4$, $R^5$, and $R^6$ are independently from each other selected from $C_1$-$C_6$ alkyl which may be substituted by one or more substituents selected from $OSi(CH_3)_3$ and F, in particular preferred $R_1$, $R_2$, $R_3$, $R_4$, $R^5$, and $R^6$ are independently from each other selected from $C_1$-$C_4$ alkyl.

A preferred example of compounds of formula (I) is bis(trimethylsilyl) phosphite.

The preparation of the compounds of formula (I) is known to the person skilled in the art. A description of a synthesis of bis(trimethylsilyl) phosphite may for example be found in M. Sekine et al., J. Org. Chem., Vol. 46 (1981), pages 2097 to 2107.

Another aspect of the present invention is the use of the compounds of formula (I) as cathode active additives in electrolyte compositions for electrochemical cells, e.g. in lithium ion capacitors, double layer capacitors and lithium batteries, in particular in secondary lithium batteries as described below. The compounds of formula (I) are capable of interacting with the cathode at the cathode-electrolyte interface thereby reducing undesired reactions of the cathode active material with the electrolyte composition, e.g. inhibiting direct contact of components of the electrolyte composition with the cathode active material by forming a film on the cathode or by inhibiting the formation of electrolyte decomposition products detrimental for the cell operation (e.g. HF). The direct contact of electrolyte composition with the cathode often leads to decomposition reactions.

The compounds of formula (I) can also be used as additives for reducing gas generation in electrolyte compositions for electrochemical cells, e.g. in lithium ion capacitors, double layer capacitors and lithium batteries, in particular in secondary lithium batteries as described below. Undesired generation of gas within an electrochemical cell is a safety issue since the increase of the internal pressure may lead to leakage of the cell and loss of electrolyte composition increasing the possibility of ignition and emission of unhealthy compounds.

The compounds of formula (I) are usually used in the electrolyte compositions in the concentrations given below for the electrolyte compositions by adding the desired amounts of the compound(s) of formula (I) to the electrolyte composition.

The electrolyte composition may contain one compound of formula (I), it may contain more than one compound of formula (I), e.g. two, three or more.

Usually the electrolyte composition contains in total at least 0.01 wt.-% of the at least one compound of formula (I), based on the total weight of electrolyte composition, preferably at least 0.02 wt.-%, and more preferred at least 0.1 wt.-%, based on the total weight of electrolyte composition. The maximum value of the total concentration of compounds of formula (I) in the electrolyte composition is usually 30 wt.-%, based on the total weight of electrolyte composition, preferably 10 wt.-%, more preferred the upper limit of the total concentration of compounds of formula (I) is 5 wt.-%, and even more preferred 3 wt.-%, based on the total weight of electrolyte composition. Usually the electrolyte composition contains in total 0.01 to 30 wt.-%, of the at least one compound of formula (I), based on the total weight of electrolyte composition, preferably 0.02 to 10 wt.-%, more preferably 0.1 to 5 wt.-% and most preferred 0.1 to 3 wt.-%.

Furthermore, the electrolyte composition may contain at least one further additive different from the compounds of formula (I). The at least one further additive different from the compounds of formula (I) may be selected from polymers, film forming additives, flame retardants, overcharging additives, wetting agents, HF and/or $H_2O$ scavenger, stabilizer for LiPF6 salt, ionic solvation enhancer, corrosion inhibitors, and gelling agents.

The minimum concentration of the at least one further additive is usually 0.005 wt.-%, preferably the minimum concentration is 0.01 wt.-% and more preferred the minimum concentration is 0.1 wt.-%, based on the total weight of electrolyte composition. The maximum concentration of the at least further additive is usually 25 wt.-%.

One class of further additives are polymers. Polymers may be selected from polyvinylidene fluoride, polyvinylidene-hexafluoropropylene copolymers, polyvinylidene-hexafluoropropylenechlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. Polymers may be added to a formulation according to the present invention in order to convert liquid formulations into quasi-solid or solid electrolytes and thus to improve solvent retention, especially during ageing. In this case they function as gelling agents.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di- substituted phosphonates, alkyl and/or aryl tri-substituted phosphines, and fluorinated derivatives thereof.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Another class of additives are film forming additives, also called SEI-forming additives. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAhN at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; organic sultones such as propylene sultone, propane sultone and their derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

A compound added may have more than one effect in the electrolyte composition and the electrochemical cell comprising the electrolyte composition. E.g. lithium oxalato borate may be added as additive enhancing the SEI formation but can also function as conducting salt.

In one embodiment of the present invention, the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978. The minimum water content of electrolyte compositions may be selected from 3 ppm, preferably 5 ppm.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte composition (A) may be prepared by methods which are known to the person skilled in the field of the production of electrolytes, generally by dissolving the lithium conductive salt(s) (i) in the corresponding solvent or solvent mixture (ii) and adding the at least one compound of formula (I) and optionally further additive(s) (iv), as described above.

The electrochemical cell comprising the electrolyte composition (A) may be a lithium battery, a double layer capacitor, or a lithium ion capacitor. The general construction of such electrochemical devices is known and is familiar to the person skilled in this art—for batteries, for example, in Linden's Handbook of Batteries (ISBN 978-0-07-162421-3).

Preferably the inventive electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds. The lithium battery is preferably a secondary lithium battery, i.e. a rechargeable lithium battery.

In particular preferred embodiments the electrochemical cell is a lithium ion battery, i.e. a secondary lithium ion electrochemical cell comprising a cathode (A) comprising a cathode active material that can reversibly occlude and release lithium ions and an anode (B) comprising an anode active material that can reversibly occlude and release lithium ions.

Anode (A) comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite materials, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon; and carbonic anode active material (thermally decomposed carbon, coke, graphite) such as a carbon composite, combusted organic polymer, and carbon fiber. A preferred carbonaceous material is graphite.

Further examples of anode active materials are lithium metal and lithium metal alloys, i.e. materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Further possible anode active materials are silicon containing materials. Silicon containing materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material comprises carbonaceous material that can reversibly occlude and release lithium ions, particularly preferred the carbonaceous material that can reversibly occlude and release lithium ions is selected from crystalline carbon, hard carbon and amorphous carbon, and particularly preferred is graphite. It is also preferred that the anode active material comprises silicon containing materials. It is further preferred that the anode active material comprises lithium ion intercalating oxides of Ti.

The inventive electrochemical cell comprises a cathode (B) comprising at least one cathode active material. The at least one cathode active material comprises a material capable of occluding and releasing lithium ions and is selected from mixed lithium transition metal oxides containing Mn and at least one second transition metal; lithium intercalating mixed oxides containing Ni, Al and at least one second transition metal; $LiNiPO_4$; $LiNiPO_4$; and $LiCoPO_4$.

Examples of mixed lithium transition metal oxides containing Mn and at least one second transition metal are lithium transition metal oxides with layered structure of formula (II)

$$Li_{1+e}(Ni_aCo_bMn_cM_d)_{1-e}O_2 \quad \text{(II)}$$

wherein a is in the range of from 0.05 to 0.9, preferred in the range of 0.1 to 0.8, b is in the range of from zero to 0.35, c is in the range of from 0.1 to 0.9, preferred in the range of 0.2 to 0.8, d is in the range of from zero to 0.2, e is in the range of from zero to 0.3, preferred in the range of >zero to 0.3, more preferred in the range of 0.05 to 0.3, with a+b+c+d=1, and M being one or more metals selected from Na, K, Al, Mg, Ca, Cr, V, Mo, Ti, Fe, W, Nb, Zr, and Zn.

Cobalt containing compounds of formula (II) are also named NCM.

Lithium transition metal oxides with layered structure of formula (II) wherein e is larger than zero are also called overlithiated.

Preferred lithium transition metal oxides with layered structure of formula (II) are compounds forming a solid solution wherein a LiM'O₂ phase in which M' is Ni, and optionally one or more transition metals selected from Co and Mn and a $Li_2MnO_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (IIa)

$$z\ LiM'O_2 \cdot (1-z)\ Li_2MnO_3 \quad \text{(IIa)}$$

wherein M' is Ni and at least one metal selected from Mn and Co;

z is 0.1 to 0.8, and wherein one or more metals selected from Na, K, Al, Mg, Ca, Cr, V, Mo, Ti, Fe, W, Nb, Zr, and Zn may be present.

Electrochemically, the Ni and if present Co atoms in the LiM'O₂ phase participate in reversible oxidation and reduction reactions leading to Li-ions deintercalation and intercalation, respectively, at voltages below 4.5 V vs. Li⁺/Li, while the $Li_2MnO_3$ phase participates only in oxidation and reduction reactions at voltages equal or above 4.5 V vs. Li⁺/Li given that Mn in the $Li_2MnO_3$ phase is in its +4 oxidation state. Therefore, electrons are not removed from the Mn atoms in this phase but from the 2p orbitals of oxygen ions, leading to the removal of oxygen for the lattice in the form of O₂ gas at least in the first charging cycling.

These compounds are also called HE-NCM due to their higher energy densities in comparison to usual NCMs. Both HE-NCM and NCM have operating voltages of about 3.0 to 3.8 V against Li/Li⁺, but high cut off voltages have to be used both for activating and cycling of HE-NCMs to actually accomplish full charging and to benefit from their higher energy densities. Usually the upper cut-off voltage for the cathode during charging against Li/Li⁺ is of at least 4.5 V for activating the HE-NCM, preferably of at least 4.6 V, more preferred of at least 4.7 V and even more preferred of at least 4.8 V. The term "upper cut-off voltage against Li/Li+ during charging" of the electrochemical cell means the voltage of the cathode of the electrochemical cell against a Li/Li+ reference anode which constitute the upper limit of the voltage at which the electrochemical cell is charged. Examples of HE-NCMs are $0.33Li_2MnO_3 \cdot 0.67Li(Ni_{0.4}Co_{0.2}Mn_{0.4})O_2$, $0.42Li_2MnO_3 \cdot 0.58Li(Ni_{0.4}Co_{0.2}Mn_{0.4})O_2$, $0.50Li_2MnO_3 \cdot 0.50Li(Ni_{0.4}Co_{0.2}Mn_{0.4})O_2$, $0.40Li_2MnO_3 \cdot 0.60Li(Ni_{0.8}Co_{0.1}Mn_{0.1})O_2$, and $0.42Li_2MnO_3 \cdot 0.58Li(Ni_{0.6}Mn_{0.4})O_2$.

Examples of manganese-containing transition metal oxides with layer structure of formula (II) wherein d is zero are $LiNi_{0.33}Mn_{0.67}O_2$, $LiNi_{0.25}Mn_{0.75}O_2$, $LiNi_{0.35}Co_{0.15}Mn_{0.5}O_2$, $LiNi_{0.21}Co_{0.08}Mn_{0.71}O_2$, $LiNi_{0.22}Co_{0.12}Mn_{0.66}O_2$, $LiNi_{0.8}Co_{0.1}Mn_{0.1}O_2$, $LiNi_{0.6}Co_{0.2}Mn_{0.2}O_2$, and $LiNi_{0.5}Co_{0.2}Mn_{0.3}O_2$. It is preferred that the transition metal oxides of general formula (II) wherein d is zero do not contain further cations or anions in significant amounts.

Examples of manganese-containing transition metal oxides with layer structure of formula (II) wherein d is larger than zero are $0.33Li_2MnO_3 \cdot 0.67Li(Ni_{0.4}Co_{0.2}Mn_{0.4})O_2$, $0.42Li_2MnO_3 \cdot 0.58Li(Ni_{0.4}Co_{0.2}Mn_{0.4})O_2$, $0.50Li_2MnO_3 \cdot 0.50Li(Ni_{0.4}Co_{0.2}Mn_{0.4})O_2$, $0.40Li_2MnO_3 \cdot 0.60Li(Ni_{0.8}Co_{0.1}Mn_{0.1})O_2$, and $0.42Li_2MnO_3 \cdot 0.58Li(Ni_{0.6}Mn_{0.4})O_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (II) are Ni-rich compounds, wherein the content of Ni is at least 50 mol.% based on the total amount of transition metal present. This includes comounds of formula (IIb)

$$Li_{1+e}(Ni_aCo_bMn_cM_d)_{1-e}O_2 \qquad (IIb)$$

wherein a is in the range of from 0.5 to 0.9, preferred in the range of 0.5 to 0.8, b is in the range of from zero to 0.35, c is in the range of from 0.1 to 0.5, preferred in the range of 0.2 to 0.5, d is in the range of from zero to 0.2, e is in the range of from zero to 0.3, with a+b+c+d=1, and M being one or more metals selected from Na, K, Al, Mg, Ca, Cr, V, Mo, Ti, Fe, W, Nb, Zr, and Zn.

Examples of Ni-rich compounds of formula (I) are $Li[Ni_{0.8}Co_{0.1}Mn_{0.1}]O_2$ (NCM 811), $Li[Ni_{0.6}Co_{0.2}Mn_{0.2}]O_2$ (NCM 622), and $Li[Ni_{0.5}Co_{0.2}Mn_{0.3}]O_2$ (NCM 523).

Further examples of mixed lithium transition metal oxides containing Mn and at least one secand transition metal are manganese-containing spinels of formula (III)

$$Li_{1+t}M_{2-t}O_{4-s} \qquad (III)$$

wherein s is 0 to 0.4, t is 0 to 0.4, and

M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (IV)

$$Li[Ni_hCo_iAl_j]O_2 \qquad (IV)$$

wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode active material may also be selected from $LiMnPO_4$, $LiNiPO_4$ and $LiCoPO_4$. These phosphates show usually olivine structure and usually upper cut-off voltages of at least 4.5 V have to be used for charging.

Cathode (B) may contain further components like binders and electrically conductive materials such as electrically conductive carbon. For example, cathode (B) may comprise carbon in a conductive polymorph, for example selected from graphite, carbon black, carbon nanotubes, graphene or mixtures of at least two of the aforementioned substances. Examples of binders used in cathode (B) are organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Anode (A) and cathode (B) may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin or Nafion separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive electrochemical cells can also be used for stationary energy stores.

The present invention is further illustrated by the following examples that do not, however, restrict the invention.

Experimental Section:

A) Electrolyte Compositions

The electrolyte compositions were prepared by dissolving 1.0 M $LiPF_6$ in different mixtures of ethyl carbonate (EC, BASF), diethyl carbonate (DEC, BASF), monofluoroethylene carbonate (FEC, BASF), 1H,1H,5H-perfluoropentyl-1,1,2,2-tetrafluoroethylether ($CF_2H(CF_2)_3CH_2OCF_2CF_2H$, FPEE, Foosung co., Ltd). Different comparative and inventive additives were added to these compositions as indicated in Tables 1 and 2. "vol. %" refers to the volume of the solvents in the electrolyte composition, "wt. %" refer to the total weight of the electrolyte composition. The additives were commercially available with the exception of compound A2 and A3. A2 was prepared according to R. Rabinowitz, J. Org. Chem., Vol. 28 (1963), pages 2975 to 2978. A3 was prepared according to M. Sekine et al., J. Org. Chem., Vol. 46 (1981), pages 2097 to 2107. All solvents were dry (water content <3 ppm). All electrolyte compositions were prepared and stored in an Ar-filled glovebox having oxygen and water levels below 1.0 ppm.

TABLE 1

Electrolyte additives employed

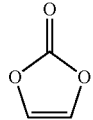

VC

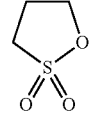

PS

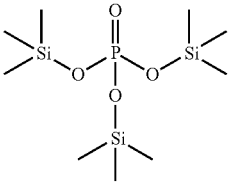

A1

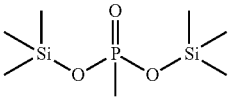

A2

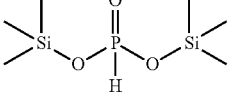

A3

TABLE 2

Electrolyte formulations employed

| Electrolyte composition | Solvents [vol. %] | | | | Additives [wt. %] | | | | | |
|---|---|---|---|---|---|---|---|---|---|---|
| | EC | FEC | DEC | FPEE | VC | PS | FEC | A1 | A2 | A3 |
| EL 1 (comparative) | | 12 | 64 | 24 | | | | | | |
| EL 2 (comparative) | | 12 | 64 | 24 | | | | | 2 | |
| EL 3 (comparative) | | 12 | 64 | 24 | | | | | 2 | |
| EL 4 (inventive) | | 12 | 64 | 24 | | | | | | 2 |
| EL 5 (comparative) | 30 | | 70 | | 1.5 | | 1.5 | | | |
| EL 6 (comparative) | 30 | | 70 | | 1.5 | 1 | 1.5 | | | |
| EL 7 (inventive) | 30 | | 70 | | 1.5 | | 1.5 | | | 1 |
| EL 8 (comparative) | | | | | 1.5 | | 1.5 | 1 | | |
| EL 9 (comparative) | | | | | 1.5 | | 1.5 | | 1 | |

B) Electrochemical Cells

B.1) HE-NCM/graphite 2032 Full Coin Cells

The positive electrodes for the electrochemical cycling experiments were prepared by coating a slurry containing 92.5 wt. % of cathode active material, 2 wt. % Graphite, 2 wt. % Super C65 carbon black and 3.5 wt. % PVDF binder suspended in N-ethyl-2-pyrrolidinone (NEP) on aluminum foil. The cathode active material was the HE-NCM $0.33Li_2MnO_3 \cdot 0.67Li(Ni_{0.4}Mn_{0.4}Co_{0.2})O_2$, HE-NCM, BASF). Commercial graphite-coated tapes from Elexcel Corporation Ltd. were used as negative electrodes. The positive, negative composite electrodes, a polypropylene separator (Celgard) and the respective electrolyte were used to manufacture 2032 coin cells. All cells were assembled in an argon-filled glove box having oxygen and water levels below 1.0 ppm and their electrochemical testing carried out in a Maccor 4000 battery-test system.

B.2) NCM424/Graphite and NCM622/Graphite Pouch Cells

The positive electrodes for the electrochemical cycling experiments in pouch cells were prepared by coating on aluminum foil (thickness=17 μm) using a roll coater a slurry containing cathode active material, carbon black and polyvinylidene fluoride (PVdF) binders suspended in N-methyl-2-pyrrolidinone (NMP). The electrode tapes were dried in a hot air chamber and dried further under vacuum at 130° C. for 8 h and the electrodes were pressed using a roll pressor. The cathode active materials employed were either $Li(Ni_{0.4}Co_{0.2}Mn_{0.4})O_2$ (NCM424) or $Li(Ni_{0.6}Co_{0.2}Mn_{0.2})O_2$ (NCM622). For the negative electrodes, an aqueous slurry aqueous was prepared by mixing graphite and carbon black with CMC (carboxymethyl cellulose) and SBR (styrene butadiene rubber). The obtained slurry was coated onto copper foil (thickness=9 μm) by using a roll coater and dried under hot air chamber (80° C. to 120° C.). The loading of the resulted electrode was found to be 10 mg/cm². The electrodes was pressed by roll pressor to an approximate thickness of 72 μm. Pouch cells (250 mAh) were assembled in Ar-filled glove box, comprising NCM positive electrodes and graphite negative electrodes with a separator superposed between cathode and anode. Thereafter, all cells were filled with electrolyte, as described in Tables 3, 4, 5 and 6, in an argon-filled glove box having oxygen and water levels below 1.0 ppm and their electrochemical testing carried out in a Maccor 4000 battery-test system.

C) Evaluation of Cycling and Cell Resistance in HE-NCM/Graphite 2032 Coin Full Cells at 25° C.

The cells were charged at a constant current of 0.067 C to a voltage of 4.7 V and discharged with a constant current of 0.067 C to a discharge voltage of 2.0 V (First activation cycle) at 25° C. The first cycle coulombic efficiency is defined as the ratio between the measured discharge and charge capacities.

Immediately after the cells are charged at 25° C. at a constant current of 0.1 C to a voltage of 4.6 V. The cells were further charged at 4.6 V until the current reached a value of 0.05 C and then discharged at a constant current of 0.1 C to a discharge voltage of 2.0 V (second cycle). The same procedure as in the second cycle was repeated 3 times (cycles 3 to 5). In the cycles 6 to 7, the cells are charged at 25° C. at a constant current of 0.2 C to a voltage of 4.6 V. The cells were further charged at 4.6 V until the current reached a value of 0.05 C and then discharged at a constant current of 0.5 C to a discharge voltage of 2.0 V. Then, the cells are charged at a constant current of 0.7 C to a voltage of 4.6 V, charged at 4.6 V until the current reached a value of 0.05 C and while keeping constant this charging conditions then the cells are discharged to a discharge voltage of 2.0 V at a constant current of 1 C (2 times, cycles 8 to 9), 2 C (2 times, cycles 10 to 11) and 3 C (2 times, cycles 12 to 13).

Following the variation of discharge rates, prolonged cycling was carried out by charging the cells at a constant current of 0.7 C to a voltage of 4.6 V, charging at 4.6 V until the current reached a value of 0.05 C and discharging to a discharge voltage of 2.0 V at a constant current of 1 C (Cycle 14). The discharge capacity measured for cycle 14 was recorded as the first discharge capacity at 1 C. This charge and discharge procedure was repeated at least 400 times or until the measured charge capacity is lower than 50% of the charge capacity of cycle 14. During the prolonged cycling experiments, DC internal resistance (DCIR) measurements were carried out at each cycle immediately after fully charging the cells (100% state-of-charge) by applying a 0.2 C current interrupt during 10 seconds. The results from the various examples are presented in Table 3.

TABLE 3

Results obtained from HE-NCM/Graphite cells cycling experiments at 25° C.

| | Electrolyte | First Cycle Coulombic Efficiency [%] | Capacity retention after 200 1 C-cycles [%] | Capacity Retention after 400 1 C-cycles [%] | Cell Resistance after 200 1 C-cycles [Ohm cm$^2$] |
|---|---|---|---|---|---|
| Comparative Example 1 | EL 1 | 87.8 | 80.5 | — | 329 |
| Comparative Example 2 | EL 2 | 87.2 | 87.2 | 81.1 | 242 |
| Comparative Example 3 | EL 3 | 86.5 | 86.7 | 77.0 | 280 |
| Inventive Example 1 | EL 4 | 88.1 | 95.6 | 90.5 | 163 |

D) Evaluation of Cycling of Pouch Cell Comprising NCM424/Graphite Anode

D.1) Formation

Pouch full-cells prepared comprising a NCM424 cathode and graphite anode were charged at a constant current of 0.1 C either to a voltage of 3.7 V or during maximum 2 hours. Then, the cells were stored for 17 hours at 45° C. followed by degassing and initial volume measurements carried out via Archimedes measurements in water at ambient temperature.

D.2) Cycle Stability of Pouch Full-Cell Comprising NCM424// Graphite at 45° C.

After completing the formation procedure, the initial charge (CCCV charge, 0.2C, 4.5V, 0.05C cut-off) and discharge (CC discharge, 0.2C, 3.0 V cut-off) capacities were measured. The cell resistance after formation was determined by charging the cells up to 50% SOC and carrying out DC internal resistance (DCIR) measurements by applying a current interrupt and the cells were discharged (CC discharge, 0.2C, 3.0V cut-off). Then the cells were charged at a constant current of 0.6 C to a voltage of 4.5 V, charged at 4.5 V until the current reached a value of 0.05 C and discharged to a voltage of 3.0 V at a constant current of 1 C and the discharge capacity measured was set as the reference discharge capacity value and corresponding to 100%. This charge and discharge procedure was repeated 200 times. The discharge capacities in cycle 100 and 200 are reported in Table 4 and are expressed as a percentage of the reference discharge capacity. Then, the cells were charged up to 50%SOC to determine their resistance after cycling via DC internal resistance (DCIR) measurements by applying a current interrupt, discharged at a constant current of 0.2 C to a voltage of 3.0 V. Finally, volume measurements after cycling were carried out via Archimedes measurements in water at ambient temperature. The results from the various examples are presented in Table 4.

TABLE 4

Results obtained from NCM-424/Graphite cells cycling experiments at 45° C.

| | Electrolyte | Capacity retention after 100 cycles [%] | Capacity Retention after 200 Cycles [%] | Cell resistance after formation [Ohm cm$^2$] | Cell resistance after 200 cycles at 45° C. [Ohm cm$^2$] | Cell volume change after 200 cycles at 45° C. [mL] |
|---|---|---|---|---|---|---|
| Comparative Example 4 | EL 1 | 93.0 | 64.2 | 107.4 | 147.0 | 0.36 |
| Comparative Example 5 | EL 3 | 93.5 | 87.2 | 68.7 | 92.0 | 0.33 |

TABLE 4-continued

Results obtained from NCM-424/Graphite cells cycling experiments at 45° C.

| | Electrolyte | Capacity retention after 100 cycles [%] | Capacity Retention after 200 Cycles [%] | Cell resistance after formation [Ohm cm$^2$] | Cell resistance after 200 cycles at 45° C. [Ohm cm$^2$] | Cell volume change after 200 cycles at 45° C. [mL] |
|---|---|---|---|---|---|---|
| Inventive Example 2 | EL 4 | 93.7 | 89.8 | 82.7 | 95.7 | 0.10 |

E) Evaluation of Cycling and High-Temperature Storability of Pouch Cell Comprising NCM622/Graphite Anode E.1) Formation Pouch full-cells prepared comprising a NCM622 cathode and graphite anode were charged up to 10% SOC at ambient temperature. Degassing process was applied to the cells before charge (CCCV charge, 0.2 C, 4.2 V cut off 0.015 C) and discharge (CC discharge, 0.2 C, 2.5 V cut-off) at ambient temperature. Then, the cells were charged again up to 4.2V (CCCV charge, 0.2 C, 4.2 V cut off 0.015 C) and stored at 60° C. for 6h. After formation, the initial charge (CCCV charge, 0.2 C, 4.2 V, 0.015C cut-off) and discharge (CC discharge, 0.2 C, 2.5 V cut-off) capacities were measured. The cell resistance after formation was determined by charging the cells up to 50% SOC and DC internal resistance (DCIR) measurements by applying a current interrupt. The results from the various examples are presented in Table 5.

E.2) Cycle Stability of Pouch Full-Cell Comprising NCM622//Graphite at 45° C.

After completing the formation procedure, the cells were charged in CC/CV mode up to 4.2V with 1 C current and cut-off current of 0.015 C and discharged down to 2.5 V with 1 C at 45° C. This charge/discharge (one cycle) procedure was repeated 250 times. The final charge (CCCV charge, 0.2 C, 4.2 V, 0.015 C cut-off) and discharge (CC discharge, 0.2 C, 2.5 V cut-off) capacities were measured after cycling. The capacity retention after cycling is expressed as the ratio between the final and initial discharge capacity. The cell resistance after cycling was determined by charging the cells up to 50% SOC and DC internal resistance (DCIR) measurements by applying a current interrupt. The results from the various examples are presented in Table 5. The positive effect of the inventive electrolyte composition on the capacity retention is larger at higher C-rates.

E.3) High Temperature Storage of Pouch Full-Cell Comprising NCM622//Graphite at 60° C.

After completing the formation procedure, the cells were charged up to 4.2 V at ambient temperature and then stored at 60° C. for 30 days. The generated gas amount (mL) during the storage was determined by Archimedes measurements in water at ambient temperature and the results are summarized in Table 6. The final charge (CCCV charge, 0.2 C, 4.2 V, 0.015 C cut-off) and discharge (CC discharge, 0.2 C, 2.5 V cut-off) capacities were measured after storage tests. The capacity retention after cycling is expressed as the ratio between the final and initial discharge capacity. The cell resistance after cycling was determined by charging the cells up to 50% SOC and DC internal resistance (DCIR) measurements by applying a current interrupt. The results from the various examples are presented in Table 6.

TABLE 6

Results obtained from NCM-622/Graphite cells storage experiments at 60° C.

| | Electrolyte | Cell Resistance after 30 days storage at 60° C. [Ohm cm$^2$] | Cell volume change after 8 days storage at 60° C. [mL] | Cell volume change after 15 days storage at 60° C. [mL] | Cell volume change after 30 days storage at 60° C. [mL] |
|---|---|---|---|---|---|
| Comparative Example 10 | EL 5 | 101.5 | 1.90 | 1.82 | 1.75 |
| Comparative Example 11 | EL 6 | 107.2 | 0.49 | 0.49 | 0.61 |

TABLE 5

Results obtained from NCM-622/Graphite cells cycling experiments at 45° C.

| | Electrolyte | Cell Resistance after formation [Ohm cm$^2$] | Cell Resistance after cycling at 45° C. [Ohm cm$^2$] | Capacity retention at 0.2 C after cycling at 45° C. [%] | Capacity retention at 1 C after cycling at 45° C. [%] |
|---|---|---|---|---|---|
| Comparative Example 6 | EL 5 | 86.9 | 285.8 | 75.0 | 53.4 |
| Comparative Example 7 | EL 6 | 81.3 | 182.4 | 85.9 | 77.4 |
| Inventive Example 3 | EL 7 | 75.6 | 126.0 | 86.4 | 79.9 |
| Comparative Example 8 | EL 8 | 75.2 | 173.3 | — | 78.7 |
| Comparative Example 9 | EL 9 | 76.5 | 149.8 | — | 78.0 |

TABLE 6-continued

Results obtained from NCM-622/Graphite cells storage experiments at 60° C.

| | Electrolyte | Cell Resistance after 30 days storage at 60° C. [Ohm cm$^2$] | Cell volume change after 8 days storage at 60° C. [mL] | Cell volume change after 15 days storage at 60° C. [mL] | Cell volume change after 30 days storage at 60° C. [mL] |
|---|---|---|---|---|---|
| Inventive Example 4 | EL 7 | 90.2 | 0.27 | 0.30 | 0.43 |
| Comparative Example 12 | EL 8 | 97.8 | 1.33 | 1.35 | 1.79 |
| Comparative Example 13 | EL 9 | 98.7 | 0.80 | 0.79 | 0.98 |

The invention claimed is:

1. An electrochemical cell, comprising:
   (A) an anode comprising an anode active material;
   (B) a cathode comprising a cathode active material comprising (b1) a mixed lithium transition metal oxide comprising Mn and a second transition metal; (b2) a lithium intercalating mixed oxide comprising Ni, Al, and a second transition metal; (b3) LiNiPO$_4$; (b4) LiMnPO$_4$; and/or (b5) LiCoPO$_4$; and
   (C) an electrolyte composition comprising (i) an aprotic organic solvent; (ii) a lithium ion containing a conducting salt; (iii) a compound of formula (I):

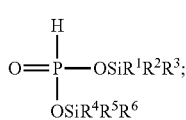

(I)

and (iv) optionally, an additive,
wherein:
R$^1$, R$^2$, R$^3$, R$^4$, R$^5$, and R$^6$ are independently H, F, R$^7$, OR$^7$, or OSi(R$^8$)$_3$,
R$^7$ C$_1$-C$_6$ alkyl, C$_2$-C$_6$ alkenyl, C$_2$-C$_6$ alkynyl, C$_5$-C$_7$ (hetero)aryl, or C$_6$-C$_{13}$ (hetero)aralkyl, optionally substituted by one or more OSi(CH$_3$)$_3$ and/or F;
R$^8$ is independently H, F, R$^7$, and OR$^7$,
R$^9$ and R$^{10}$ are independently H, F, R$^7$, OR$^7$, or OSi(R$^8$)$_3$, and
R$^{11}$ is H or R$^7$,
wherein the electrochemical cell has a first cycle coulombic efficiency/capacity retention after 200 and/or 400 1 C-cycles greater than an otherwise identical cell using a P-alkyl-substituted phosphonate in place of the compound of formula (I).

2. The electrochemical cell of claim 1, wherein the cathode active material is a lithium transition metal oxide having a layered structure of formula (II):

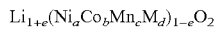

(II)

wherein:
a is in a range of from 0.05 to 0.9,
b is in a range of from zero to 0.35,
c is in a range of from 0.1 to 0.9,
d is in a range of from zero to 0.2,
e is in a range of from zero to 0.3,
with a+b+c+d=1, and
M is Na, K, Al, Mg, Ca, Cr V, Mo, Ti Fe, W, Nb, Zr, and/or Zn.

3. The electrochemical cell of claim 1, wherein the cathode active material is a manganese-containing spinel of formula (III):

(III)

wherein:
s is in a range of from 0 to 0.4,
t is in a range of from 0 to 0.4, and
M is (i) and Co, (ii) Mn and Ni, or (iii) Mn, Co, and Ni.

4. The electrochemical cell of claim 1, wherein the cathode active material is the lithium intercalating mixed oxide (b2).

5. The electrochemical cell of claim 1, wherein the cathode active material is LiNiPO$_4$, LiMnPO$_4$, or LiCoPO$_4$.

6. The electrochemical cell of claim 1, wherein the cathode active material is the lithium transition metal oxide (b 1) having a layered structure of formula (IIa):

(IIa)

wherein:
M' (i)Ni and Mn, (ii) Ni and Co, or (iii) Ni, Mn, and Co;
z is in a range of from 0.1 to 0.8, and
wherein, optionally, Na, K, Al, Mg, Ca, Cr, V, Mo, Ti, Fe, W, Nb, Zr, and/or Zn may be present.

7. The electrochemical cell claim 1, wherein the electrolyte composition (C) comprises 0.01 to 30 wt. % of the compound of formula (I) based on total electrolyte composition weight.

8. The electrochemical cell of claim 1, wherein R$^1$, R$^2$, R$^3$, R$^4$, R$^5$, and R$^6$ are independently a C$_1$-C$_4$ alkyl.

9. The electrochemical cell of claim 1, wherein the compound of formula (I) is bis(trimethylsilyl) phosphite.

10. The electrochemical cell of claim 1, wherein the aprotic organic solvent (i) is selected from the group consisting of optionally fluorinated cyclic and acyclic organic carbonates, optionally fluorinated ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles, optionally fluorinated cyclic and acyclic phosphates, and mixtures thereof.

11. The electrochemical cell of claim 1, wherein the aprotic organic solvent (i) is selected from the group consisting of optionally fluorinated ethers and polyethers, optionally fluorinated cyclic and acyclic organic carbonates, and mixtures thereof.

12. The cell of claim 1, wherein the electrolyte composition comprises the additive (iv) comprising a film forming additive, flame retardant, overcharging additive, wetting agent, HF scavenger, H$_2$ scavenge, LiPF$_6$ salt stabilizer, ionic solvation enhancer, corrosion inhibitor, and/or gelling agent.

13. The cell of claim 1, wherein anode active material is is lithium metal, a lithium metal alloy, a carbonaceous material, and/or a lithium ion intercalating oxide of a Ti and/or Si-comprising material.

14. The cell of claim 1, wherein anode active material is a silicon comprising material.

15. An electrolytic composition, comprising a compound of formula (I):

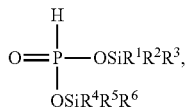
(I)

as a cathode active additive,
wherein:
$R^1$, $R^2$, $R^3$, $R^4$, $R^5$, and $R^6$ are independently H, F, $R^7$, OR', or $OSi(R^8)_3$,
$R^7$ $C_1$-$C_6$ alkyl, $C_2$-$C_6$ alkenyl, $C_2$-$C_6$ alkynyl, $C_5$-$C_7$ (hetero)aryl, or $C_6$-$C_{13}$ (hetero)aralkyl, optionally substituted by one or more $OSi(CH_3)_3$ and/or F,
$R^8$ is independently H, F, $R^7$ or $OR^7$,
$R^9$ and $R^{10}$ are independently H, F, $R^7$, $OR^7$, or $OSi(R^8)_3$, and
$R^{11}$ is H or $R^7$,
wherein the composition in an electrochemical cell has a first cycle coulombic efficiency/capacity retention after 200 and/or 400 1 C-cycles greater than an otherwise identical cell using a P-alkyl-substituted phosphonate in place of the compound of formula (I).

16. An electrolyte composition, comprising a compound of formula (I):

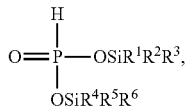
(I)

wherein:
$R^1$, $R^2$, $R^3$, $R^4$, $R^5$, and $R^6$ are independently H, F, $R^7$, $OR^7$, or $OSi(R^8)_3$,
$R^7$ $C_1$-$C_6$ alkyl, $C_2$-$C_6$ alkenyl, C2-$C_6$ alkynyl, $C_5$-$C_7$ (hetero)aryl, or $C_6$-$C_{13}$ (hetero)aralkyl, optionally substituted by one or more $OSi(CH_3)_3$ and/or F,
$R^8$ is independently H, F, $R^7$ or $OR^7$,
$R^9$ and $R^{10}$ are independently H, F, $R^7$ $OR^7$, or $OSi(R^8)_3$, and
$R^{11}$ is H or $R^7$,
wherein the composition in an electrochemical cell has a first cycle coulombic efficiency/capacity retention after 200 and/or 400 1 C-cycles greater than an otherwise identical cell using a P-alkyl-substituted phosphonate in place of the compound of formula (I).

17. The electrochemical cell of claim 1, wherein the anode active material comprises a graphite material.

18. The electrochemical cell of claim 1, wherein the aprotic organic solvent is fluorinated and no non-fluorinated aprotic organic solvent is present.

19. The electrochemical cell of claim 1, wherein the cathode active material comprises $0.33Li_2MnO_3 \cdot 0.67Li(Ni_{0.4}Co_{0.2}Mn_{0.4})O_2$, $0.42Li_2MnO_3 \cdot 0.58Li(Ni_{0.4}Co_{0.2}Mn_{0.4})O_2$, $0.50Li_2MnO_3 \cdot 0.50Li(Ni_{0.4}Co_{0.2}Mn_{0.4})O_2$, $0.40Li_2MnO_3 \cdot 0.60Li(Ni_{0.8}Co_{0.1}Mn_{0.1})O_2$, and $0.42Li_2MnO_3 \cdot 0.58Li(Ni_{0.6}Mn_{0.4})O_2$.

20. The electrochemical cell of claim 1, wherein $R^1$, $R^2$, $R^3$, $R^4$, $R^5$, and $R^6$ are independently $C_1$-$C_6$ alkyl.

* * * * *